United States Patent
Yuan

(10) Patent No.: US 11,032,130 B2
(45) Date of Patent: Jun. 8, 2021

(54) TROUBLESHOOTING METHOD, APPARATUS, AND SYSTEM

(71) Applicant: HUAWEI TECHNOLOGIES CO., LTD., Guangdong (CN)

(72) Inventor: Shoudong Yuan, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 45 days.

(21) Appl. No.: 16/022,392

(22) Filed: Jun. 28, 2018

(65) Prior Publication Data

US 2018/0309621 A1    Oct. 25, 2018

Related U.S. Application Data

(63) Continuation of application No. PCT/CN2016/111936, filed on Dec. 24, 2016.

(30) Foreign Application Priority Data

Dec. 31, 2015  (CN) .......................... 201511032571.4

(51) Int. Cl.
*H04L 29/08* (2006.01)
*H04L 12/24* (2006.01)
(Continued)

(52) U.S. Cl.
CPC ...... *H04L 41/0672* (2013.01); *G06F 9/45533* (2013.01); *G06F 9/45558* (2013.01);
(Continued)

(58) Field of Classification Search
CPC ..... H04L 41/0672; H04L 1/24; H04L 41/065; H04L 41/0886; H04L 43/0817;
(Continued)

(56) References Cited

U.S. PATENT DOCUMENTS 8,966,315 B2 *  2/2015  Burn .................... G06F 11/1446
                                                711/173
2004/0172574 A1 *  9/2004  Wing .................. G06F 11/2025
                                                714/4.12
(Continued)

FOREIGN PATENT DOCUMENTS

CN    102801806 A    11/2012
CN    104170323 A    11/2014
(Continued)

OTHER PUBLICATIONS

ETSI GS NFV 002 v1.2.1 (Dec. 2014),Network Functions Virtualisation (NFV);Architectural Framework,total 21 pages.
(Continued)

*Primary Examiner* — Philip J Chea
*Assistant Examiner* — Wuji Chen
(74) *Attorney, Agent, or Firm* — Womble Bond Dickinson (US) LLP

(57) ABSTRACT

Embodiments of the present disclosure describe a troubleshooting method, apparatus, and system, and pertain to the field of troubleshooting. An embodiment of the method may include monitoring, by a virtualized network function (VNF), an operating status of at least one virtual machine (VM) inside the VNF. The method may also include determining, by the VNF according to a fault when the fault occurs on the VM, whether to perform VM rebuilding recovery. Furthermore the method may include sending, by the VNF, a rebuilding recovery request to a virtualized network function manager (VNFM) when determining to perform the VM rebuilding recovery. In this way, when the fault occurs on the VM, the VIM performs automatic rebuilding recovery for the VM by interactions between the VNFM and the VIM.

15 Claims, 5 Drawing Sheets

(51) Int. Cl.
  *G06F 9/455* (2018.01)
  *H04L 1/24* (2006.01)
  *H04L 12/26* (2006.01)
(52) U.S. Cl.
  CPC ............... *H04L 1/24* (2013.01); *H04L 29/08* (2013.01); *H04L 41/065* (2013.01); *H04L 41/0886* (2013.01); *H04L 43/0817* (2013.01); *G06F 2009/45595* (2013.01)
(58) Field of Classification Search
  CPC ................. H04L 29/08; G06F 9/45533; G06F 2009/45595; G06F 9/45558
  See application file for complete search history.

(56) References Cited

U.S. PATENT DOCUMENTS

| | | | |
|---|---|---|---|
| 2008/0189468 A1* | 8/2008 | Schmidt | G06F 11/2046 711/6 |
| 2010/0299666 A1 | 11/2010 | Agbaria et al. | |
| 2011/0019531 A1* | 1/2011 | Kim | G06F 11/203 370/216 |
| 2011/0154320 A1* | 6/2011 | Verma | G06F 8/63 718/1 |
| 2011/0231696 A1* | 9/2011 | Ji | G06F 11/1438 714/3 |
| 2013/0166951 A1* | 6/2013 | Burn | G06F 11/1438 714/19 |
| 2013/0311824 A1* | 11/2013 | Ji | G06F 11/1438 714/15 |
| 2015/0324227 A1* | 11/2015 | Sizemore | G06F 9/48 718/1 |
| 2015/0370657 A1* | 12/2015 | Marakala | G06F 11/2041 714/15 |
| 2016/0077935 A1* | 3/2016 | Zheng | G06F 11/2028 714/4.12 |
| 2016/0103698 A1* | 4/2016 | Yang | G06F 9/5022 714/4.11 |
| 2016/0170848 A1* | 6/2016 | Yang | G06F 11/2023 714/4.12 |
| 2016/0224409 A1* | 8/2016 | Liu | H04L 67/10 |
| 2016/0232072 A1 | 8/2016 | Skerry et al. | |
| 2016/0277509 A1* | 9/2016 | Qiang | H04L 67/16 |
| 2016/0328251 A1* | 11/2016 | Bernstein | G06F 9/455 |
| 2016/0330067 A1 | 11/2016 | Liu et al. | |
| 2016/0371127 A1* | 12/2016 | Antony | G06F 9/45558 |
| 2017/0134788 A1* | 5/2017 | Lee | G06F 9/45545 |
| 2017/0208123 A1* | 7/2017 | Parker | H04L 43/10 |
| 2017/0346676 A1* | 11/2017 | Andrianov | H04L 41/0631 |
| 2018/0018193 A1* | 1/2018 | Yabushita | G06F 11/20 |

FOREIGN PATENT DOCUMENTS

| | | |
|---|---|---|
| CN | 104468181 A | 3/2015 |
| CN | 105187249 A | 12/2015 |
| EP | 3119034 A1 | 1/2017 |
| EP | 3340535 A1 | 6/2018 |
| WO | 2015042937 A1 | 4/2015 |
| WO | 2015109443 A1 | 7/2015 |

OTHER PUBLICATIONS

Guilherme Koslovski et al. Reliability Support in Virtual Infrastructures. 2nd IEEE International Conference on Cloud Computing Technology and Science. 2010. pp. 49-58. XP031900236.

Yong Li et al. Software-Defined Network Function Virtualization: A Survey. IEEE Access ( vol. 3 ).Dec. 9, 2015. pp. 2542-2553. XP011594390.

* cited by examiner

TROUBLESHOOTING METHOD, APPARATUS, AND SYSTEM

CROSS-REFERENCE TO RELATED APPLICATIONS

This application is a continuation of International Application No. PCT/CN2016/111936, filed on Dec. 24, 2016, which claims priority to Chinese Patent Application No. 201511032571.4, filed on Dec. 31, 2015. The disclosures of the aforementioned applications are hereby incorporated by reference in their entireties.

TECHNICAL FIELD

The present application relates to the field of troubleshooting, and in particular, to a troubleshooting method, apparatus, and system.

BACKGROUND

A conventional telecommunications network is formed by using various dedicated hardware devices, and different hardware devices are used for different applications. As the telecommunications network grows in scale, a conventional telecommunications system becomes increasingly complex, which brings many challenges.

A Network Functions Virtualization (NFV) technology may be simply understood as migrating functions of network elements used in the telecommunications network from a dedicated hardware platform to a universal commercial off-the-shelf (COTS) product. A hardware platform is first set up by using COTS, and then the NFV technology is used to convert the network elements used in the telecommunications network into independent virtualized applications operating on the hardware platform. Each network element may be implemented by one or more virtual machines (VM).

A fault may occur when a VM is operating. For example, an operating system crashes, or communication between two VMs is in a subhealth state. In the prior art, a VM fault problem is mainly resolved by means of manual recovery by technical personnel.

SUMMARY

Embodiments of the present invention provide a troubleshooting method, apparatus, and system, so as to resolve a prior-art problem that a VM fault is mainly rectified by a manual recovery by technical personnel. The technical solutions are as follows:

According to a first aspect, a troubleshooting method is provided, where the method includes:

monitoring, by a virtualized network function (Virtual Network Function, VNF), an operating status of at least one virtual machine VM inside the VNF;

determining, by the VNF according to a fault when the fault occurs on the VM, whether to perform VM rebuilding recovery; and sending, by the VNF, a rebuilding recovery request to a virtualized network function manager (Virtualized Network Function Manager, VNFM) when determining to perform the VM rebuilding recovery, where the VNFM is configured to instruct, according to the rebuilding recovery request, a virtualized infrastructure manager (Virtualized Infrastructure Manager, VIM) to perform rebuilding recovery for the VM.

The VNF sends the rebuilding recovery request to the VNFM when determining, according to the fault that occurs on the VM, to perform rebuilding recovery for the VM, and the VNFM instructs, according to the rebuilding recovery request, the VIM to perform the rebuilding recovery for the VM. In this way, when the fault occurs on the VM, the VIM performs automatic rebuilding recovery for the VM by interactions between the VNFM and the VIM; in addition, the VNFM instructs, according to the rebuilding recovery request, the VIM to perform the rebuilding recovery for the VM, so that a response time of VM troubleshooting is reduced, and the automatic rebuilding recovery saves resources for managing the system.

In a first possible embodiment of the first aspect, the determining, by the VNF according to a fault when the fault occurs on the VM, whether to perform VM rebuilding recovery includes:

determining, by the VNF when an operating system fault occurs on the VM, to perform local rebuilding recovery for the VM, where the local rebuilding recovery is rebuilding recovery performed for the VM on a physical computer to which the VM originally belongs.

When the operating system fault occurs on the VM, the VNF determines to perform the local rebuilding recovery for the VM. The rebuilding recovery is performed for the VM on the physical computer to which the VM originally belongs, thereby reducing processing time of a VM fault, and implementing the automatic rebuilding recovery for the VM fault.

In a second possible embodiment of the first aspect, the determining, by the VNF according to a fault when the fault occurs on the VM, whether to perform VM rebuilding recovery includes:

determining, by the VNF when a communication subhealth fault occurs on the VM, to perform remote rebuilding recovery for the VM, where the communication subhealth fault is a fault in which quality of network communication between VMs is poorer than a preset condition, and the remote rebuilding recovery is rebuilding recovery performed for the VM on a physical computer other than a physical computer to which the VM originally belongs.

When the communication subhealth fault occurs on the VM, the VNF determines to perform the remote rebuilding recovery for the VM. In this way, the VNF determines, according to different VM faults, to perform rebuilding recovery for the VM by using different rebuilding recovery manners, thereby improving a VM rebuilding recovery success rate, and improving VM rebuilding recovery efficiency.

With reference to the first aspect, the first possible embodiment of the first aspect, or the second possible embodiment of the first aspect, in a third possible embodiment, the method further includes:

receiving, by the VNF, a rebuilding recovery feedback sent by the VNFM, where the rebuilding recovery feedback includes a rebuilding failure feedback or a rebuilding success feedback, where the rebuilding failure feedback is a feedback given when the VIM fails to rebuild the VM according to an instruction of the VNFM, and the rebuilding success feedback is a feedback given when the VIM succeeds in rebuilding the VM according to the instruction of the VNFM.

After instructing, according to the rebuilding recovery request, the VIM to perform the rebuilding recovery for the VM, the VNFM sends the rebuilding recovery result to the VNF, and sends different feedbacks to the VNF for different rebuilding recovery results, so that the VNF learns a processing result of the faulty VM in a timely manner, and can learn attribute information of the VM after the rebuilding recovery in a timely manner.

According to a second aspect, a troubleshooting apparatus is provided, where the apparatus includes at least one unit, and the at least one unit is configured to implement the troubleshooting method provided in the first aspect or the possible embodiments of the first aspect.

According to a third aspect, a troubleshooting system is provided, where the system includes: a VNF, a VNFM, and a VIM, where the VNF is configured to: monitor an operating status of at least one virtual machine VM inside the VNF; determine, according to a fault when the fault occurs on the VM, whether to perform VM rebuilding recovery; and send a rebuilding recovery request to the VNFM when determining to perform the VM rebuilding recovery;

the VNFM is configured to instruct, according to the rebuilding recovery request, the VIM to perform rebuilding recovery for the VM; and the VIM is configured to perform the rebuilding recovery for the VM according to an instruction of the VNFM.

Beneficial effects brought by the technical solutions provided in the embodiments of the present invention are as follows:

A VNF monitors an operating status of at least one virtual machine VM inside the VNF; the VNF determines, according to a fault when the fault occurs on the VM, whether to perform VM rebuilding recovery; and the VNF sends a rebuilding recovery request to a VNFM when determining to perform the VM rebuilding recovery, where the VNFM is configured to instruct, according to the rebuilding recovery request, a VIM to perform rebuilding recovery for the VM. In this way, a problem in the prior art that when a fault occurs on a VM, the VM fault needs to be rectified by a manual recovery by technical personnel is resolved; when the fault occurs on the VM, the VIM performs automatic rebuilding recovery for the VM by interactions between the VNFM and the VIM; and the VNFM instructs, according to the rebuilding recovery request, the VIM to perform the rebuilding recovery for the VM, so that a response time of VM troubleshooting is reduced, and the automatic rebuilding recovery saves resources for managing the system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3A-1 and FIG. 3A-2 are a flowchart of a troubleshooting method according to another example embodiment of the present invention;

DESCRIPTION OF EMBODIMENTS

To make the objectives, technical solutions, and advantages of the present invention clearer, the following further describes the embodiments of the present invention in detail with reference to the accompanying drawings.

A "unit" described in the specification refers to a functional structure in terms of logic division, and the "unit" may be implemented by hardware, software, or by a combination of software and hardware.

Figure 1:
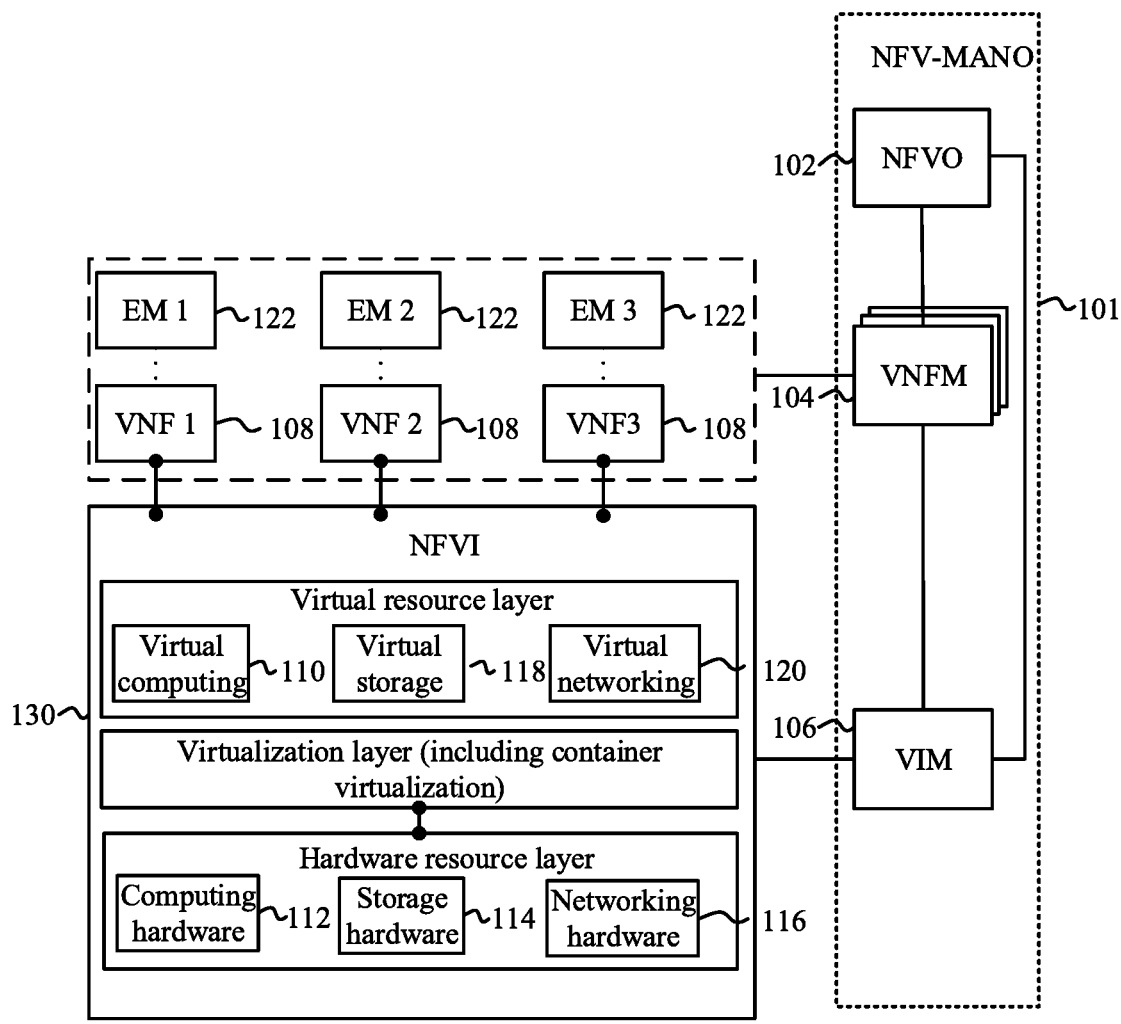
FIG. 1 is a schematic diagram of an NFV system architecture according to an example embodiment of the present invention.

Referring to FIG. 1, FIG. 1 shows a schematic diagram of an NFV system architecture according to an example embodiment of the present invention. The system architecture is an embodiment of an implementation environment and may include: an NFV management and orchestration (NFV MANO) 101, an NFV infrastructure (NFVI) layer 130, multiple virtualized network functions (VNF) 108, and multiple element managers (EM) 122.

The NFV MANO 101 includes an NFV orchestrator (NFVO) 102, one or more VNFMs 104, and a VIM 106. The NFVI 130 includes computing hardware 112, storage hardware 114, networking hardware 116, a virtualization layer, virtual computing 110, virtual storage 118, and virtual networking 120.

The NFV MANO 101 is configured to perform monitoring and management on the VNF 108 and the NFVI 130. The NFVO 102 may implement a network service on the NFVI 130, or may execute a resource-related request from the one or more VNFMs 104, send configuration information to the VNFM 104, and collect status information of the VNF 108. The VNFM 104 may manage one or more VNFs 108. The VNFM 104 may perform various management functions, such as instantiating, updating, querying, scaling in and scaling out, and/or terminating the VNF 108. The VIM 106 may perform a resource management function. The VNFM 104 and the VIM 106 may communicate with each other to allocate a resource and exchange configuration and status information of virtualized hardware resources.

The NFVI 130 includes hardware resources, software resources, or a combination thereof to complete deployment of a virtualized environment. Hardware resources include the computing hardware 112, the storage hardware 114, and the networking hardware 116. The computing hardware 112 is configured to provide processing and computing resources. The storage hardware 114 may be a local memory located in a server. The networking hardware 116 may be a switch, a router, and/or any other network device for which a switching function is configured.

Optionally, resources of the computing hardware 112 and the storage hardware 114 may be centralized.

The virtualization layer in the NFVI 130 can abstract hardware resources from a physical layer and decouple the VNF 108, so as to provide virtualized resources to the VNF 108. A virtual resource layer includes the virtual computing 110, the virtual storage 118, and the virtual networking 120. The virtual computing 110 and the virtual storage 118 may be provided to the VNF 108 in a form of a virtual machine and/or another virtual container. For example, one or more VNFs 108 may be deployed on one VM.

The virtualization layer abstracts the networking hardware 116 to form the virtual networking 120, the virtual networking 120 may include a virtual switch, and the virtual switch is used to provide a connection between a virtual machine and another virtual machine. In addition, a transport network in the networking hardware 116 may be virtualized by using a centralized control plane and a separate forwarding plane.

As shown in FIG. 1, the VNFM 104 may interact with the VNF 108 and the EM 122 to manage a life cycle of the VNF and exchange configuration and status information. The VNF 108 may be configured as virtualization of at least one network function performed by one physical network device. For example, in an embodiment of an implementation solution, the VNF 108 may be configured to provide functions of different network elements in an IMS network, such as a network function of a P-CSCF, an S-CSCF, or an HSS. The EM 122 is configured to manage one or more VNFs 108.

It should be noted that, this embodiment of the present invention relates to information exchanged between the VNF 108, the VNFM 104, and the VIM 106. In this embodiment of the present invention, one VNF 108 includes at least one VM (not shown in the figure). The VNF 108 is configured to monitor an operating status of at least one VM inside the VNF 108; the VNF 108 determines, according to a fault when the fault occurs on the VM, whether to perform VM rebuilding recovery; when the VNF 108 determines to perform the VM rebuilding recovery, the VNF 108 sends a rebuilding recovery request to the VNFM 104; and the VNFM 104 instructs, according to the rebuilding recovery request, the VIM 106 to perform rebuilding recovery for the VM on which the fault occurs.

Figure 2:
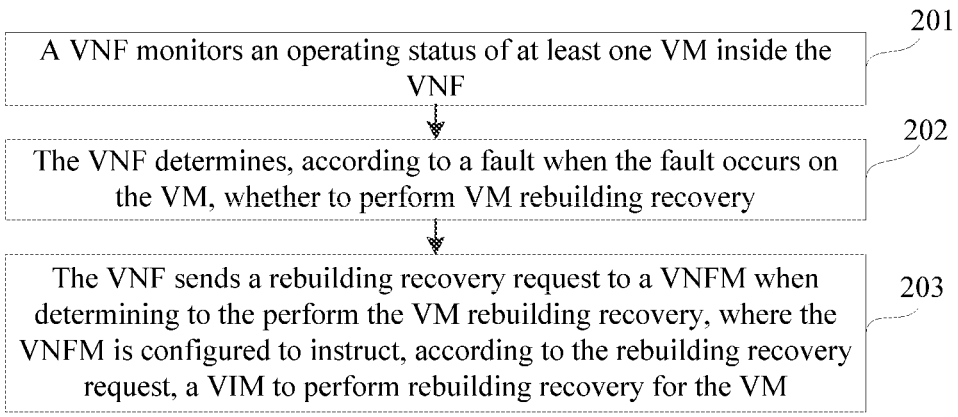
FIG. 2 is a flowchart of a troubleshooting method according to an example embodiment of the present invention.

Referring to FIG. 2, FIG. 2 shows a flowchart of a troubleshooting method according to an example embodiment of the present invention. This embodiment is described by using an example in which the method is used in the embodiment of the network architecture shown in FIG. 1. The method may include the following several steps:

Step 201: A VNF monitors an operating status of at least one VM inside the VNF.

Step 202: The VNF determines, according to a fault when the fault occurs on the VM, whether to perform VM rebuilding recovery.

Step 203: The VNF sends a rebuilding recovery request to a VNFM when determining to perform the VM rebuilding recovery, where the VNFM is configured to instruct, according to the rebuilding recovery request, a VIM to perform rebuilding recovery for the VM.

In conclusion, according to the troubleshooting method provided in this embodiment of the present invention, a VNF monitors an operating status of at least one VM inside the VNF; the VNF determines, according to a fault when the fault occurs on the VM, whether to perform VM rebuilding recovery; and the VNF sends a rebuilding recovery request to a VNFM when determining to perform the VM rebuilding recovery, where the VNFM is configured to instruct, according to the rebuilding recovery request, a VIM to perform rebuilding recovery for the VM. In this way, a problem in the prior art that when a fault occurs on a VM, the VM fault needs to be rectified by a manual recovery by technical personnel is resolved; when the fault occurs on the VM, the VIM performs automatic rebuilding recovery for the VM by interactions between the VNFM and the VIM; and the VNFM instructs, according to the rebuilding recovery request, the VIM to perform the rebuilding recovery for the VM, so that a response time of VM troubleshooting is reduced, and the automatic rebuilding recovery saves resources for managing the system.

One point that should be noted is that VM fault types include an operating system fault and a communication subhealth fault. The operating system fault is a fault that occurs in an operating system inside a VM, and may also be referred to as an operating system (OS) fault. The communication subhealth fault is a fault in which quality of network communication between VMs is poorer than a preset condition.

In another possible embodiment, only the operating system fault occurs on the VM, or only the communication subhealth fault occurs on the VM. This embodiment is described by using an example in which both the operating system fault and the communication subhealth fault occur on the VM, and the VM fault types are not specifically limited herein.

A second point that should be noted is that the VNF determines, according to different fault types, to perform different rebuilding recovery for the VM. When the operating system fault occurs on the VM, the VNF determines, according to the operating system fault, to perform local rebuilding recovery for the VM, and when the local rebuilding recovery performed for the VM fails for N times, the VNF determines to perform remote rebuilding recovery for the VM on which the operating system fault occurs. When the communication subhealth fault occurs on the VM, the VNF determines, according to the communication subhealth fault, to directly perform the remote rebuilding recovery for the VM.

The local rebuilding recovery is rebuilding recovery performed for the VM on a physical computer to which the VM originally belongs; and the remote rebuilding recovery is rebuilding recovery performed for the VM on a physical computer other than the physical computer to which the VM originally belongs.

A third point that should be noted is that preset attribute information of the VM after the rebuilding recovery remains unchanged.

The preset attribute information includes all or a part of a processor parameter, a memory parameter, a hard disk parameter, and a network interface parameter.

This embodiment is described by using an example in which the preset attribute information includes all of the processor parameter, the memory parameter, the hard disk parameter, and the network interface parameter, and parameter content included in the preset attribute information is not specifically limited in this embodiment.

Figures 1, 3A:
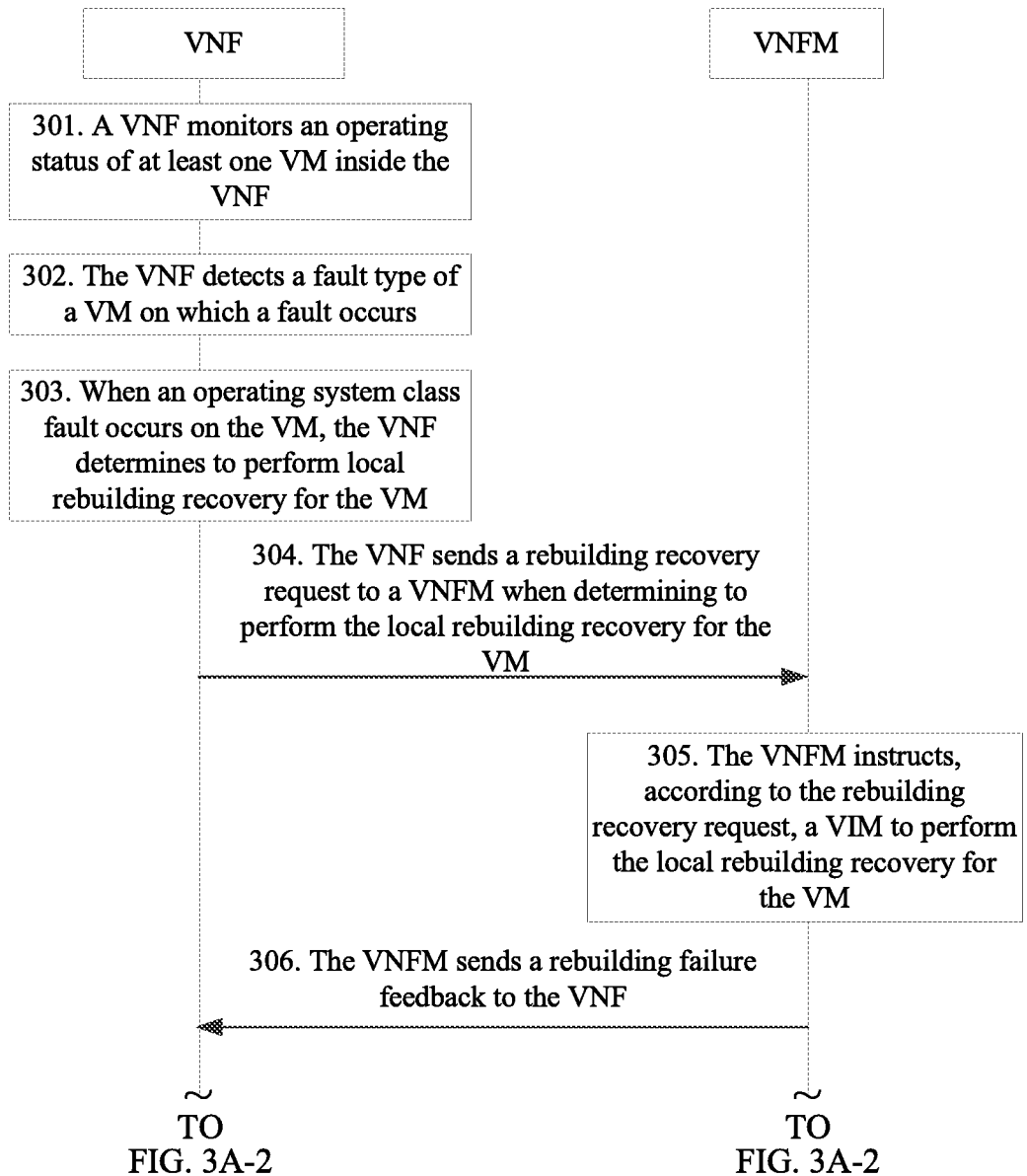
Figures 2, 3A:
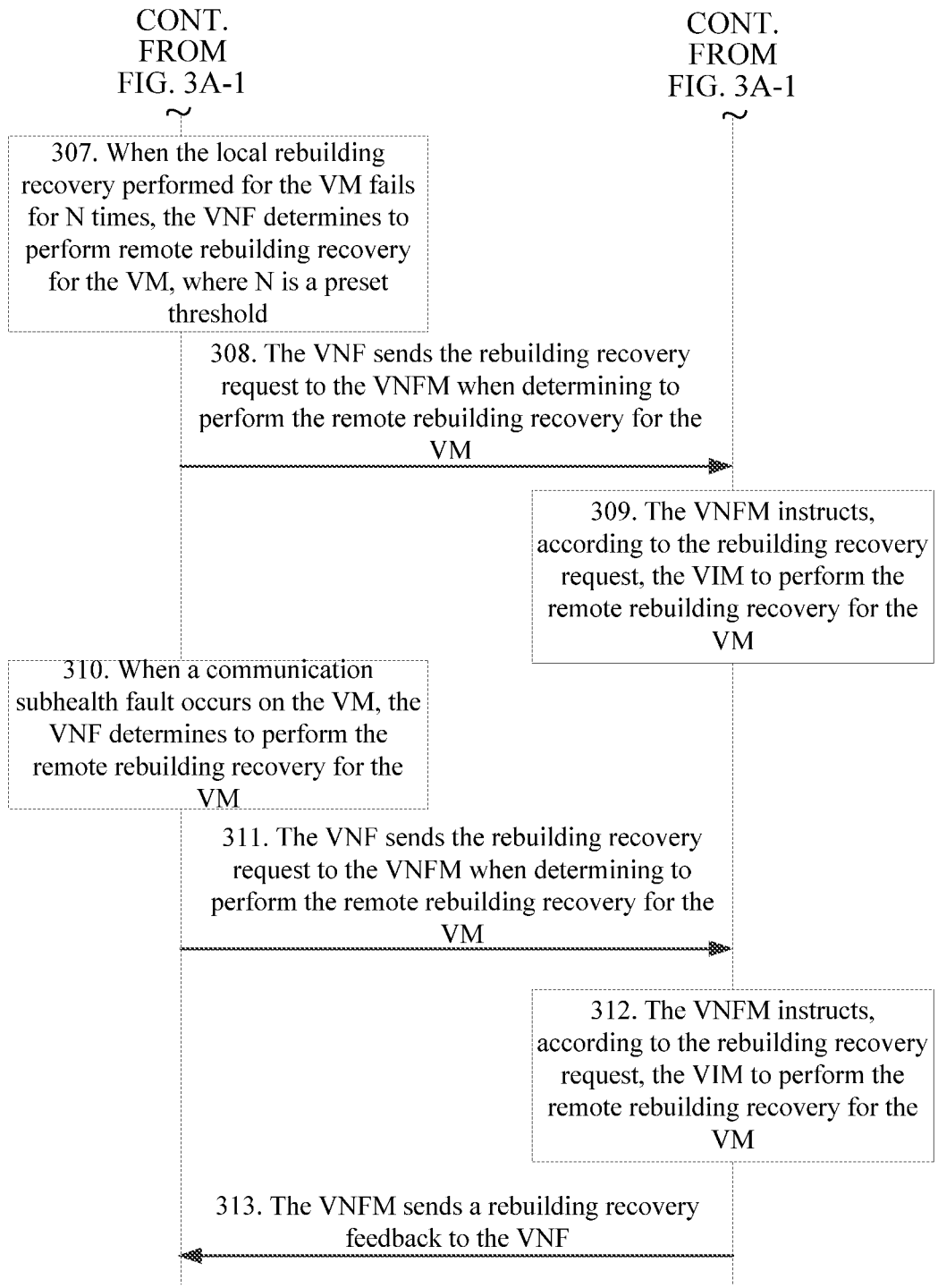

Referring to FIG. 3A-1 and FIG. 3A-2, FIG. 3A-1 and FIG. 3A-2 show a flowchart of a troubleshooting method according to another example embodiment of the present invention. This embodiment is described by using an example in which the method is used in the embodiment of the network architecture shown in FIG. 1. The method may include the following several steps.

Step 301: A VNF monitors an operating status of at least one VM inside the VNF.

In an operating process, a troubleshooting system monitors the operating status of the at least one VM inside the VNF by using the VNF.

One VNF includes at least one VM. Optionally, when one VNF includes only one VM, the VNF monitors whether the VM inside the VNF operates properly; or when one VNF includes multiple VMs, the multiple VMs may communicate with each other, and the VNF not only monitors whether communication between the multiple VMs inside the VNF is normal, but also monitors whether each VM inside the VNF operates properly.

Optionally, the troubleshooting system includes multiple VNFs, each VNF includes at least one VM, and each VNF can monitor only an operating status of the at least one VM inside the VNF.

For example, the VNF detects that a fault occurs on an operating status of one VM inside the VNF. For another example, the VNF detects that a fault occurs in communication between two VMs inside the VNF.

Step 302: The VNF detects a fault type of a VM on which a fault occurs.

When detecting that an exception occurs on the operating status of the at least one VM inside the VNF, the VNF detects, according to the exception that occurs on the operating status, the fault type of the VM on which the fault occurs.

VM fault types include an operating system fault and/or a communication subhealth fault. The operating system fault is a fault that occurs in an operating system inside a VM, and may also be referred to as an OS fault. The communication subhealth fault is a fault in which quality of network communication between VMs is poorer than a preset condition.

When detecting that a fault occurs in an operating system inside the VM, the VNF determines that the operating system fault occurs on the VM. When detecting that quality of network communication between VMs is poorer than the preset condition, the VNF determines that the communication subhealth fault occurs on the VM.

When the operating system fault occurs on the VM, step 303 is to be performed. When the communication subhealth fault occurs on the VM, step 307 is to be performed.

Step 303: When an operating system fault occurs on the VM, the VNF determines to perform local rebuilding recovery for the VM.

Figure 3B:
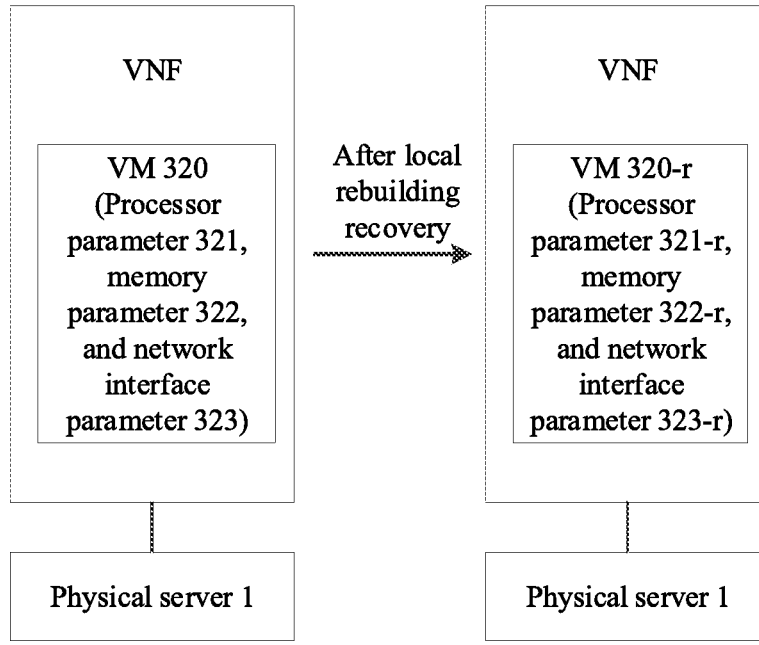
FIG. 3B is a schematic diagram of an internal structure of a VNF before and after local rebuilding recovery according to an example embodiment of the present invention.

The local rebuilding recovery is rebuilding recovery performed for the VM on a physical computer to which the VM originally belongs. As shown in FIG. 3B, before the local rebuilding recovery, a VM 320, and a processor parameter 321, a memory parameter 322, and a network interface parameter 323 that correspond to the VM 320 are included inside the VNF, and before the local rebuilding recovery, a physical computer to which the VM 320 belongs is a physical server 1. After the local rebuilding recovery, the VM 320-r after the rebuilding recovery is included inside the VNF, the processor parameter 321-r, the memory parameter 322-r, and the network interface parameter 323-r that correspond to the VM 320-r, and the physical server 1 to which the VM 323-r belongs still remain unchanged.

When the VNF detects that the operating system fault occurs on one of the at least one VM inside the VNF, the VNF sends the detected operating system fault to an arbiter component inside the VNF. The arbiter component is configured to determine, according to the operating system fault sent by the VNF, to perform the local rebuilding recovery for the VM. The arbiter component inside the VNF may be implemented by software.

Optionally, the arbiter component may determine, according to the operating system fault sent by the VNF and a configuration file, to automatically power off the VM. The configuration file may be configured by a user, or may be preconfigured by the operating system.

For example, the VNF detects that the operating system fault occurs on one VM inside the VNF, the VNF sends the operating system fault to the arbiter component, and the arbiter component determines, according to the operating system fault and the configuration file, to perform the local rebuilding recovery for the VM on which the operating system fault occurs. For another example, the VNF detects that the operating system fault occurs on multiple VMs inside the VNF, the VNF sends the operating system fault to the arbiter component, and the arbiter component determines, according to the operating system fault and the configuration file, to automatically power off the multiple VMs on which the fault occurs.

Step 304: The VNF sends a rebuilding recovery request to a VNFM when determining to perform the local rebuilding recovery.

When the arbiter component inside the VNF determines, according to the received operating system fault, to perform the local rebuilding recovery for the VM, the VNF sends the rebuilding recovery request to the VNFM.

Optionally, when the arbiter component inside the VNF determines, according to the received operating system fault, to perform the local rebuilding recovery for the VM, the VNF calls a rebuild interface provided by the VNFM, and sends the rebuilding recovery request to the VNFM by using the rebuild interface.

The rebuild interface is an interface used for communication between the VNF and the VNFM in VM fault processing.

Optionally, the rebuilding recovery request includes: a rebuild type, a quantity of VMs to be recovered, and a VM identifier of a VM to be recovered.

The rebuild type is used for the VNFM to instruct, according to the rebuild type, a VIM to perform rebuilding recovery corresponding to the rebuild type on the VM. The quantity of VMs to be recovered is used for the VNFM to determine a quantity of VMs for which rebuilding recovery needs to be performed. The VM identifier is used to determine a location of the VM for which rebuilding recovery needs to be performed. Optionally, the VIM may perform the local rebuilding recovery for multiple VMs at the same time according to an instruction of the VNFM. The multiple VMs may be VMs inside one VNF, or may be VMs in multiple VNFs.

The VNFM instructs, according to the rebuild type, the quantity of VMs to be recovered, and the VM identifier of the VM to be recovered that are included in the rebuilding recovery request, the VIM to perform rebuilding recovery for the VM corresponding to the rebuilding recovery request.

Step 305: The VNFM instructs, according to the rebuilding recovery request, a VIM to perform the local rebuilding recovery for the VM.

The VNFM instructs, according to the received rebuilding recovery request for the local rebuilding recovery, the VIM to perform the local rebuilding recovery for the VM.

Step 306: The VNFM sends a rebuilding failure feedback to the VNF.

The rebuilding failure feedback is a feedback given when the VIM fails to rebuild the VM according to the instruction of the VNFM.

When the VNFM fails to instruct, according to the received rebuilding recovery request for the local rebuilding recovery, the VIM to perform the local rebuilding recovery for the VM, the VNFM sends the rebuilding failure feedback to the VNF.

Step 307: When the local rebuilding recovery performed for the VM fails for N times, the VNF determines to perform remote rebuilding recovery for the VM, where N is a preset threshold.

The remote rebuilding recovery is rebuilding recovery performed for the VM on a physical computer other than the physical computer to which the VM originally belongs.

Figure 3C:
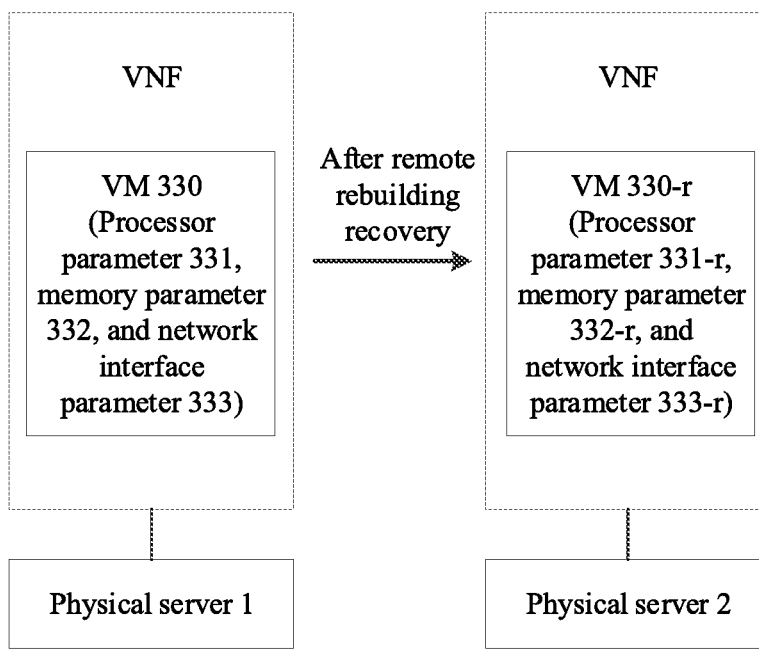
FIG. 3C is a schematic diagram of an internal structure of a VNF before and after remote rebuilding recovery according to an example embodiment of the present invention.

When the local rebuilding recovery performed for the VM fails for N times, the VNF determines to perform the remote rebuilding recovery for the VM, where N is the preset threshold. As shown in FIG. 3C, before the remote rebuilding recovery, a VM 330, and a processor parameter 331, a memory parameter 332, and a network interface parameter 333 that correspond to the VM 330 are included inside the VNF, and before the remote rebuilding recovery, a physical computer to which the VM 330 belongs is a physical server 1. After the remote rebuilding recovery, the VM 330-*r* is included inside the VNF, the processor parameter 331-*r*, the memory parameter 332-*r*, the network interface parameter 333-*r* that correspond to the VM 330-*r* still remain unchanged, but the physical computer to which the VM 330-*r* belongs changes from the physical server 1 to a physical server 2.

When detecting that the operating system fault occurs on the VM inside the VNF, the VNF first determines to perform the local rebuilding recovery for the VM on which the fault occurs. After the local rebuilding recovery performed for the VM on which the fault occurs fails for N times, the VNF determines to perform the remote rebuilding recovery for the VM on which the fault occurs.

The local rebuilding recovery is rebuilding recovery performed for the VM on the physical computer to which the VM originally belongs, while the remote rebuilding recovery is rebuilding recovery performed for the VM on the physical computer other than the physical computer to which the VM originally belongs.

Optionally, preset attribute information of the VM after the rebuilding recovery remains unchanged.

The preset attribute information includes at least one of a processor parameter, a memory parameter, a hard disk parameter, and a network interface parameter.

Step 308: The VNF sends the rebuilding recovery request to the VNFM when determining to perform the remote rebuilding recovery.

After the local rebuilding recovery performed for the VM fails for N times, the VNF sends the rebuilding recovery request for the remote rebuilding recovery to the VNFM, and the VNFM instructs, according to the remote rebuilding recovery request, the VIM to perform the remote rebuilding recovery for the VM.

Step 309: The VNFM instructs, according to the rebuilding recovery request, the VIM to perform the remote rebuilding recovery for the VM.

The VNFM instructs, according to the received rebuilding recovery request for the remote rebuilding recovery, the VIM to perform the remote rebuilding recovery for the VM.

When the local rebuilding recovery performed for the VM fails for N times, the remote rebuilding recovery is performed, and regardless of whether the remote rebuilding recovery succeeds or fails, step 313 is to be performed.

Step 310: When a communication subhealth fault occurs on the VM, the VNF determines to perform the remote rebuilding recovery for the VM.

The communication subhealth fault is a fault in which quality of network communication between VMs is poorer than a preset condition, and the remote rebuilding recovery is rebuilding recovery performed for the VM on the physical computer other than the physical computer to which the VM originally belongs.

Optionally, the troubleshooting system includes multiple VNFs, each VNF includes at least one VM, multiple VMs inside one VNF may communicate with each other by using a network inside the VNF, and VMs in the multiple VNFs may communicate with each other by using a network between the VNFs.

When quality of network communication between the multiple VMs inside the VNF is poorer than the preset condition, it is determined that the communication subhealth fault occurs on the multiple VMs.

Optionally, when quality of network communication between VMs in the multiple VNFs is poorer than the preset condition, it is determined that the communication subhealth fault occurs on the VMs that are in the multiple VNFs and perform network communication.

When the VNF detects that the communication subhealth fault occurs on the at least one VM inside the VNF, the VNF sends the detected communication subhealth fault to the arbiter component inside the VNF, and the arbiter component is configured to determine, according to the communication subhealth fault sent by the VNF, to perform the remote rebuilding recovery for the VM. The arbiter component inside the VNF may be implemented by software.

Optionally, the arbiter component may determine, according to the communication subhealth fault sent by the VNF and a configuration file, to automatically power off the VM. The configuration file may be configured by a user, or may be preconfigured by the operating system.

For example, if the VNF detects that the communication subhealth fault occurs on the multiple VMs inside the VNF in a communication process, the VNF sends the communication subhealth fault to the arbiter component, and the arbiter component determines, according to the communication subhealth fault and the configuration file, to perform the remote rebuilding recovery for all the VMs on which the communication subhealth fault occurs. Optionally, the arbiter component determines, according to the communication subhealth fault and the configuration file, to perform the remote rebuilding recovery for some of the VMs on which the communication subhealth fault occurs.

Step 311: The VNF sends the rebuilding recovery request to the VNFM when determining to perform the remote rebuilding recovery.

When the arbiter component inside the VNF determines, according to the received communication subhealth fault, to perform the remote rebuilding recovery for the VM, the VNF sends the rebuilding recovery request to the VNFM.

Optionally, when the arbiter component inside the VNF determines, according to the received communication subhealth fault, to perform the remote rebuilding recovery for the VM, the VNF calls a rebuild interface provided by the VNFM, and sends the rebuilding recovery request to the VNFM by using the rebuild interface. The rebuild interface is an interface used for communication between the VNF and the VNFM in VM fault processing.

Optionally, the VNFM provides a shared rebuild interface, and the rebuild interface is used for the VNF to send the request for the local rebuilding recovery and the request for the remote rebuilding recovery to the VNFM.

Optionally, the VNFM provides multiple rebuild interfaces, the VNF calls a rebuild interface A provided by the VNFM when sending the request for the local rebuilding recovery to the VNFM, and the VNF calls a rebuild interface B provided by the VNFM when sending the request for the remote rebuilding recovery to the VNFM.

Optionally, the rebuilding recovery request sent by the VNF to the VNFM includes a rebuild type, a quantity of VMs to be recovered, and a VM identifier of a VM to be recovered.

The rebuild type is used for the VNFM to instruct, according to the rebuild type, a VIM to perform rebuilding recovery corresponding to the rebuild type on the VM. The quantity of VMs to be recovered is used for the VNFM to determine a quantity of VMs for which rebuilding recovery needs to be performed. The VM identifier is used to determine a location of the VM for which rebuilding recovery needs to be performed. Optionally, the VIM may perform the remote rebuilding recovery for multiple VMs at the same time according to an instruction of the VNFM. The multiple VMs may be VMs inside one VNF, or may be VMs in multiple VNFs.

The VNFM instructs, according to the rebuild type, the quantity of VMs to be recovered, and the VM identifier of the VM to be recovered that are included in the rebuilding recovery request, the VIM to perform rebuilding recovery for the VM corresponding to the rebuilding recovery request.

Step 312: The VNFM instructs, according to the rebuilding recovery request, the VIM to perform the remote rebuilding recovery for the VM.

The VNFM instructs, according to the received rebuilding recovery request for the remote rebuilding recovery, the VIM to perform the remote rebuilding recovery for the VM.

Step 313: The VNFM sends a rebuilding recovery feedback to the VNF.

The rebuilding recovery feedback includes a rebuilding failure feedback or a rebuilding success feedback, where the rebuilding failure feedback is a feedback given when the VIM fails to rebuild the VM according to an instruction of the VNFM, and the rebuilding success feedback is a feedback given when the VIM succeeds in rebuilding the VM according to the instruction of the VNFM.

After the VNFM instructs, according to the rebuilding recovery request, the VIM to perform rebuilding recovery for the VM, the VNFM feeds back a rebuilding recovery result to the VNF.

Correspondingly, the VNF receives the rebuilding recovery feedback sent by the VNFM.

The rebuilding recovery feedback includes: the rebuilding failure feedback or the rebuilding success feedback. When the VIM does not succeed in performing the rebuilding recovery for the VM according to the instruction of the VNFM, the VNFM sends the rebuilding failure feedback to the VNF; or after the VIM succeeds in performing the rebuilding recovery for the VM according to the instruction of the VNFM, the VNFM sends the rebuilding success feedback to the VNF.

If the VIM succeeds in performing the rebuilding recovery for the VM according to the instruction of the VNFM, the rebuilding success feedback sent by the VNFM to the VNF carries preset attribute information of the VM after the rebuilding recovery.

The preset attribute information includes at least one of a processor parameter, a memory parameter, a hard disk parameter, and a network interface parameter.

The network interface parameter includes an interface parameter for communication between VMs inside each VNF and an interface parameter for communication between VMs in VNFs.

If the VIM does not succeed in performing the rebuilding recovery for the VM according to the instruction of the VNFM, the rebuilding failure feedback sent by the VNFM to the VNF carries a quantity of VMs for which the rebuilding recovery is not successfully performed and corresponding VM identifiers.

Optionally, the rebuilding recovery feedback further carries a name of a physical computer to which the VM after the rebuilding recovery belongs.

In conclusion, according to the troubleshooting method provided in this embodiment of the present invention, a VNF monitors an operating status of at least one VM inside the VNF; the VNF determines, according to a fault when the fault occurs on the VM, whether to perform VM rebuilding recovery; and the VNF sends a rebuilding recovery request to a VNFM when determining to perform the VM rebuilding recovery, where the VNFM is configured to instruct, according to the rebuilding recovery request, a VIM to perform rebuilding recovery for the VM. In this way, a problem in the prior art that when a fault occurs on a VM, the VM fault needs to be rectified by a manual recovery by technical personnel is resolved; when the fault occurs on the VM, the VIM performs automatic rebuilding recovery for the VM by interactions between the VNFM and the VIM; and the VNFM instructs, according to the rebuilding recovery request, the VIM to perform the rebuilding recovery for the VM, so that a response time of VM troubleshooting is reduced, and the automatic rebuilding recovery saves resources for managing the system.

In addition, when the operating system fault occurs on the VM, the VNF determines to perform the local rebuilding recovery for the VM. The rebuilding recovery is performed for the VM on the physical computer to which the VM originally belongs, thereby reducing processing time of a VM fault, and implementing the automatic rebuilding recovery for the VM fault.

After instructing, according to the rebuilding recovery request, the VIM to perform the rebuilding recovery for the VM, the VNFM sends the rebuilding recovery result to the VNF, and sends different feedbacks to the VNF for different rebuilding recovery results, so that the VNF learns a processing result of the faulty VM in a timely manner, and can learn attribute information of the VM after the rebuilding recovery in a timely manner.

In a specific example, a VNF monitors an operating status of at least one VM inside the VNF, and when the VNF detects that a fault occurs on one VM inside the VNF, the VNF determines, according to the fault that occurs on the VM, to perform rebuilding recovery for the VM. After the VNF determines to perform rebuilding recovery for the VM, the VNF calls a rebuild interface provided by a VNFM, and sends a rebuilding recovery request to the VNFM by using the rebuild interface, where the rebuilding recovery request includes: a rebuild type, a quantity of VMs to be recovered, and a VM identifier of a VM to be recovered.

For example, parameters included in the rebuilding recovery request are shown in the following Table 1:

TABLE 1

| Parameter type | Request parameter | Description |
| --- | --- | --- |
| Rebuild type | Mandatory | A value of this parameter has a length of 1 to 16 bytes (including "\ 0'). This parameter has two types: rebuild OS/rebuild VM. |
| VM quantity | Optional | VM list |
| VM identifier | Optional | A value of this parameter has a length of 1 to 16 bytes (including "\ 0'), and is used to identify a VM. |

After the VNF calls the rebuild interface provided by the VNFM and sends the rebuilding recovery request to the VNFM, the VNFM instructs, according to the rebuilding recovery request, a VIM to perform the rebuilding recovery for the VM. After the rebuilding recovery is performed, the VNFM sends a rebuilding recovery feedback to the VNF. The rebuilding recovery feedback includes preset attribute information of the VM after the rebuilding recovery and a name of a physical computer to which the VM belongs. The preset attribute information includes at least one of a processor parameter, a memory parameter, a hard disk parameter, and a network interface parameter.

For example, parameters included in the rebuilding recovery feedback are shown in the following Table 2:

TABLE 2

| Parameter type | Request parameter | Description |
| --- | --- | --- |
| Return | Mandatory | — |
| New VM information | Optional | — |
| VM name | Optional | A value of this parameter has a length of 1 to 64 bytes (including '\ 0'). |
| VNF identifier | Optional | A value of this parameter has a length of 1 to 16 bytes (including '\ 0'). |
| VM identifier | Optional | A value of this parameter has a length of 1 to 64 bytes (including '\ 0'). |
| Infrastructure layer VM identifier | Optional | A value of this parameter has a length of 1 to 64 bytes (including '\ 0'). |
| Processor interface | Optional | — |
| Memory size | Optional | — |
| Hard disk size | Optional | — |
| Interaction interface between VMs inside a VNF | Optional | — |
| Interaction interface between VMs in VNFs | Optional | — |
| Physical server identifier | Optional | A value of this parameter has a length of 1 to 64 bytes (including '\ 0'). |
| Extended parameter | Optional | — |

For example, an embodiment of implementation code for calling, by the VNF, the rebuild interface provided by the VNFM, and sending the rebuilding recovery request to the VNFM is as follows:

```
PUT /v2/vapps/instances/vm/0000000001/action
Host: 172.28.1.1:35357
Content-Type: application/json
charset=UTF-8
X-Auth-Token: 2012
{
  "rebuild_type": "rebuildos",
  "rebuildos_type": "shared",
  "vms": [{
     "vm_id": ""
  }]
}
```

For example, an embodiment of implementation code for sending, by the VNFM, the rebuilding recovery feedback to the VNF after the rebuilding recovery is successful is as follows:

```
Successful response result:
{
"return":
```

```
{
"new_vm_info":[{
   "vm_name":"",
   "vnf_id":"",
   "vm_id":""}]
}
}
```

Figure 4:
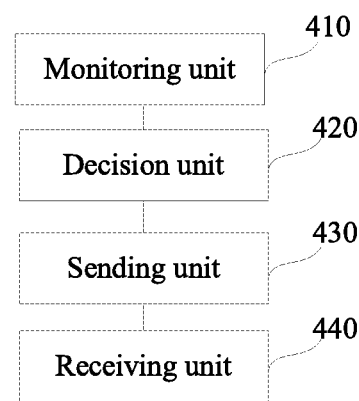
FIG. 4 is a block diagram of a troubleshooting apparatus according to an example embodiment of the present invention.

Referring to FIG. 4, FIG. 4 shows a block diagram of a troubleshooting apparatus according to an example embodiment of the present invention. The troubleshooting apparatus may be implemented by software, hardware, or a combination thereof as all or a part of a troubleshooting system. The troubleshooting apparatus may include: a monitoring unit 410, a decision unit 420, and a sending unit 430.

The monitoring unit 410 is configured for a VNF to monitor an operating status of at least one VM inside the VNF.

The decision unit 420 is configured to determine, according to a fault when the fault occurs on the VM, whether to perform VM rebuilding recovery.

The sending unit 430 is configured to send a rebuilding recovery request to a VNFM when it is determined to perform the VM rebuilding recovery, where the VNFM is configured to instruct, according to the rebuilding recovery request, a VIM to perform rebuilding recovery for the VM.

For related details, refer to the foregoing method embodiments.

In another optional embodiment, the decision unit 420 is further configured to determine, when an operating system fault occurs the VM, to perform local rebuilding recovery for the VM.

The local rebuilding recovery is rebuilding recovery performed for the VM on a physical computer to which the VM originally belongs.

In another optional embodiment, the sending unit 430 is further configured to determine, when the local rebuilding recovery performed for the VM fails for N times, to perform remote rebuilding recovery for the VM, where N is a preset threshold.

The remote rebuilding recovery is rebuilding recovery performed for the VM on a physical computer other than the physical computer to which the VM originally belongs.

In another optional embodiment, the decision unit 420 is further configured to determine, when a communication subhealth fault occurs the VM, to perform the remote rebuilding recovery for the VM.

The communication subhealth fault is a fault in which quality of network communication between VMs is poorer than a preset condition, and the remote rebuilding recovery is rebuilding recovery performed for the VM on the physical computer other than the physical computer to which the VM originally belongs.

In another optional embodiment, the sending unit 430 is further configured to call a rebuild interface provided by the VNFM and send the rebuilding recovery request to the VNFM by using the rebuild interface.

In another optional embodiment, preset attribute information of the VM after the rebuilding recovery remains unchanged.

The preset attribute information includes at least one of a processor parameter, a memory parameter, a hard disk parameter, and a network interface parameter.

In another optional embodiment, the troubleshooting apparatus further includes a receiving unit 440.

The receiving unit 440 is configured to receive a rebuilding recovery feedback sent by the VNFM.

The rebuilding recovery feedback includes a rebuilding failure feedback or a rebuilding success feedback, where the rebuilding failure feedback is a feedback given when the VIM fails to rebuild the VM according to an instruction of the VNFM, and the rebuilding success feedback is a feedback given when the VIM succeeds in rebuilding the VM according to the instruction of the VNFM.

In conclusion, according to the troubleshooting apparatus provided in this embodiment of the present invention, a VNF monitors an operating status of at least one VM inside the VNF; the VNF determines, according to a fault when the fault occurs on the VM, whether to perform VM rebuilding recovery; and the VNF sends a rebuilding recovery request to a VNFM when determining to perform the VM rebuilding recovery, where the VNFM is configured to instruct, according to the rebuilding recovery request, a VIM to perform rebuilding recovery for the VM. In this way, a problem in the prior art that when a fault occurs on a VM, the VM fault needs to be rectified by a manual recovery by technical personnel is resolved; when the fault occurs on the VM, the VIM performs automatic rebuilding recovery for the VM by interactions between the VNFM and the VIM; and the VNFM instructs, according to the rebuilding recovery request, the VIM to perform the rebuilding recovery for the VM, so that a response time of VM troubleshooting is reduced, and the automatic rebuilding recovery saves resources for managing the system.

In addition, when the operating system fault occurs on the VM, the VNF determines to perform the local rebuilding recovery for the VM. The rebuilding recovery is performed for the VM on the physical computer to which the VM originally belongs, thereby reducing processing time of a VM fault, and implementing the automatic rebuilding recovery for the VM fault.

After instructing, according to the rebuilding recovery request, the VIM to perform the rebuilding recovery for the VM, the VNFM sends the rebuilding recovery result to the VNF, and sends different feedbacks to the VNF for different rebuilding recovery results, so that the VNF learns a processing result of the faulty VM in a timely manner, and can learn attribute information of the VM after the rebuilding recovery in a timely manner.

Figure 5:
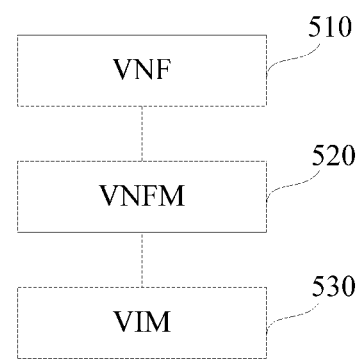
FIG. 5 is a block diagram of a troubleshooting system according to an example embodiment of the present invention.

Referring to FIG. 5, FIG. 5 shows a block diagram of a troubleshooting system according to an example embodiment of the present invention. The troubleshooting system may include a VNF 510, a VNFM 520, and a VIM 530.

The VNF 510 is configured to determine, according to a fault when the fault occurs on a VM, whether to perform VM rebuilding recovery.

The VNFM 520 is configured to instruct, according to a rebuilding recovery request, the VIM 530 to perform rebuilding recovery for the VM.

The VIM 530 is configured to perform the rebuilding recovery for the VM according to an instruction of the VNFM 520.

In conclusion, according to the troubleshooting system provided in this embodiment of the present invention, a VNF monitors an operating status of at least one VM inside the VNF; the VNF determines, according to a fault when the fault occurs on the VM, whether to perform VM rebuilding recovery; and the VNF sends a rebuilding recovery request to a VNFM when determining to perform the VM rebuilding recovery, where the VNFM is configured to instruct, according to the rebuilding recovery request, a VIM to perform rebuilding recovery for the VM. In this way, a problem in the prior art that when a fault occurs on a VM, the VM fault needs to be rectified by a manual recovery by technical personnel is resolved; when the fault occurs on the VM, the VIM performs automatic rebuilding recovery for the VM by interactions between the VNFM and the VIM; and the VNFM instructs, according to the rebuilding recovery request, the VIM to perform the rebuilding recovery for the VM, so that a response time of VM troubleshooting is reduced, and the automatic rebuilding recovery saves resources for managing the system.

It should be noted that, the division of the foregoing functional modules is merely used as an example for description when the troubleshooting apparatus provided in the foregoing embodiments processes a fault. In actual application, the foregoing functions may be assigned to different functional modules for completion according to a requirement, that is, an internal structure of the device may be divided into different functional modules, so as to complete all or a part of the functions described above. Moreover, the troubleshooting apparatus and troubleshooting method provided in the foregoing embodiments belong to the same inventive concept. For a specific implementation process of the troubleshooting apparatus, refer to the method embodiments, and details are not repeatedly described herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the principle of the present invention shall fall within the protection scope of the present invention.

What is claimed is:

1. A troubleshooting method, wherein the method comprises:
    monitoring, by a virtualized network function (VNF), an operating status of at least one virtual machine (VM) inside the VNF;
    determining, by the VNF according to a fault when the fault occurs on the VM, whether to perform VM rebuilding recovery, wherein the VNF determines among different types of recovery rebuilding comprising a local rebuilding recovery or a remote rebuilding recovery according to a type of the fault experienced by the VM, wherein the local rebuilding recovery is determined to be performed based at least in part on the determined type of fault being an operating system fault type detected to have occurred with an operating system inside the VM, and wherein the remote rebuilding recovery is determined to be performed based at least in part on the determined type of fault being a communication subhealth fault type detected to have degraded a quality of network communication of the VM; and
    sending, by the VNF, a rebuilding recovery request including the determined type of recovery rebuilding to a virtualized network function manager (VNFM) when determining to perform the VM rebuilding recovery, wherein the VNFM is configured to instruct, according to the rebuilding recovery request, a virtualized infrastructure manager (VIM) to perform rebuilding recovery for the VM.

2. The method according to claim 1, wherein the determining, by the VNF according to a fault when the fault occurs on the VM, whether to perform VM rebuilding recovery comprises:

determining, by the VNF when an operating system fault occurs on the VM, to perform local rebuilding recovery for the VM, wherein the local rebuilding recovery is rebuilding recovery performed for the VM on a physical computer to which the VM originally belongs.

3. The method according to claim 2, wherein the method further comprises:

determining, by the VNF when the local rebuilding recovery performed for the VM fails for N times, to perform remote rebuilding recovery for the VM, wherein N is a preset threshold, wherein the remote rebuilding recovery is rebuilding recovery performed for the VM on a physical computer other than the physical computer to which the VM originally belongs.

4. The method according to claim 1, wherein the determining, by the VNF according to a fault when the fault occurs on the VM, whether to perform VM rebuilding recovery comprises:

determining, by the VNF when a communication subhealth fault occurs on the VM, to perform remote rebuilding recovery for the VM, wherein the communication subhealth fault is a fault in which quality of network communication between VMs is poorer than a preset condition, and the remote rebuilding recovery is rebuilding recovery performed for the VM on a physical computer other than a physical computer to which the VM originally belongs.

5. The method according to claim 1, wherein the sending, by the VNF, a rebuilding recovery request to a virtualized network function manager VNFM comprises:

calling, by the VNF, a rebuild interface provided by the VNFM, and sending the rebuilding recovery request to the VNFM by using the rebuild interface.

6. The method according to claim 1, wherein preset attribute information of the VM after the rebuilding recovery remains unchanged, wherein the preset attribute information comprises at least one of a processor parameter, a memory parameter, a hard disk parameter, and a network interface parameter.

7. The method according to claim 1, the method further comprises:

receiving, by the VNF, a rebuilding recovery feedback sent by the VNFM, wherein the rebuilding recovery feedback comprises a rebuilding failure feedback or a rebuilding success feedback, wherein the rebuilding failure feedback is a feedback given when the VIM fails to rebuild the VM according to an instruction of the VNFM, and the rebuilding success feedback is a feedback given when the VIM succeeds in rebuilding the VM according to the instruction of the VNFM.

8. A troubleshooting apparatus, wherein the apparatus comprises:

a transceiver;
one or more processors; and
non-transitory computer-readable memory storing a program to be executed by the one or more processors, the program including:

instructions for monitoring an operating status of at least one virtual machine (VM) inside a virtualized network function (VNF);

instructions for determining, according to a fault when the fault occurs on the VM, whether to perform VM rebuilding recovery, wherein a type of recovery rebuilding comprising a local rebuilding recovery or a remote rebuilding recovery is determined according to a type of the fault determined from among a plurality of different types of faults experienced by the VM, and wherein different types of rebuilding recoveries are associated with one or more different types of faults, and wherein the local rebuilding recovery is determined to be performed based at least in part on the determined type of fault being an operating system fault type detected to have occurred with an operating system inside the VM, and wherein the remote rebuilding recovery is determined to be performed based at least in part on the determined type of fault being a communication subhealth fault type detected to have degraded a quality of network communication of the VM; and instructions for sending, via the transceiver, a rebuilding recovery request including the determined type of recovery rebuilding to a virtualized network function manager (VNFM) when determining to perform the VM rebuilding recovery, wherein the VNFM is configured to instruct, according to the rebuilding recovery request, a virtualized infrastructure manager (VIM) to perform rebuilding recovery for the VM.

9. The apparatus according to claim 8, wherein the program further includes instructions for determining, when an operating system fault occurs on the VM, to perform local rebuilding recovery for the VM, wherein the local rebuilding recovery is rebuilding recovery performed for the VM on a physical computer to which the VM originally belongs.

10. The apparatus according to claim 9, wherein the program further includes instructions for determining, when the local rebuilding recovery performed for the VM fails for N times, to perform remote rebuilding recovery for the VM, wherein N is a preset threshold, wherein the remote rebuilding recovery is rebuilding recovery performed for the VM on a physical computer other than the physical computer to which the VM originally belongs.

11. The apparatus according to claim 8, wherein the program further includes instructions for determining, when a communication subhealth fault occurs on the VM, to perform remote rebuilding recovery for the VM, wherein the communication subhealth fault is a fault in which quality of network communication between VMs is poorer than a preset condition, and the remote rebuilding recovery is rebuilding recovery performed for the VM on a physical computer other than a physical computer to which the VM originally belongs.

12. The apparatus according to claim 8, wherein the program further includes instructions for calling a rebuild interface provided by the VNFM, and send a rebuilding recovery request to the VNFM by using the rebuild interface.

13. The apparatus according to claim 8, wherein preset attribute information of the VM after the rebuilding recovery remains unchanged, wherein the preset attribute information comprises at least one of a processor parameter, a memory parameter, a hard disk parameter, and a network interface parameter.

14. The apparatus according to claim 8, wherein the program further includes instructions for receiving a rebuilding recovery feedback sent by the VNFM, wherein the rebuilding recovery feedback comprises a rebuilding failure feedback or a rebuilding success feedback, wherein the rebuilding failure feedback is a feedback given when the VIM fails to rebuild the VM according to an instruction of the VNFM, and the rebuilding success feedback is a feedback given when the VIM succeeds in rebuilding the VM according to the instruction of the VNFM.

15. A non-transitory computer readable storage medium with instruction stored therefore, which when executed by a processor of a troubleshooting system causes the processor to perform operations comprising monitoring, by a virtualized network function (VNF), an operating status of at least one virtual machine (VM) inside the VNF;

determining, by the VNF according to a fault when the fault occurs on the VM, whether to perform VM rebuilding recovery, wherein the VNF determines s-among different types a typo of recovery rebuilding comprising a local rebuilding recovery or a remote rebuilding recovery according to a type of the fault experienced by the VM, and wherein the local rebuilding recovery is determined to be performed based at least in part on the determined type of fault being an operating system fault type detected to have occurred with an operating system inside the VM, and wherein the remote rebuilding recovery is determined to be performed based at least in part on the determined type of fault being a communication subhealth fault type detected to have degraded a quality of network communication of the VM; and sending, by the VNF, a rebuilding recovery request including the determined type of recovery rebuilding to a virtualized network function manager (VNFM) when determining to perform the VM rebuilding recovery, wherein the VNFM is configured to instruct, according to the rebuilding recovery request, a virtualized infrastructure manager (VIM) to perform rebuilding recovery for the VM.

\* \* \* \* \*